United States Patent [19]
Shen et al.

[11] Patent Number: 5,598,550
[45] Date of Patent: Jan. 28, 1997

[54] CACHE CONTROLLER FOR PROCESSING SIMULTANEOUS CACHE ACCESSES

[75] Inventors: Gene W. Shen; James S. Golab, both of Austin; William C. Moyer, Dripping Springs, all of Tex.

[73] Assignee: Motorola Inc., Schaumburg, Ill.

[21] Appl. No.: 346,986

[22] Filed: Nov. 30, 1994

Related U.S. Application Data

[63] Continuation of Ser. No. 829,114, Jan. 31, 1992, abandoned.

[51] Int. Cl.[6] .................................................. G06F 13/362
[52] U.S. Cl. ......................... 395/473; 395/427; 395/458; 395/478
[58] Field of Search .................................. 395/472, 473, 395/458

[56] References Cited

U.S. PATENT DOCUMENTS

| | | | |
|---|---|---|---|
| 4,322,795 | 3/1982 | Lange et al. | 395/425 |
| 4,345,309 | 8/1982 | Arulpragasam et al. | 364/200 |
| 4,392,200 | 7/1983 | Arulpragasam et al. | 395/425 |
| 4,620,275 | 10/1986 | Wallach et al. | 364/200 |
| 4,646,233 | 2/1987 | Weatherford et al. | 395/425 |
| 4,731,739 | 3/1988 | Woffinden et al. | 395/250 |
| 4,926,317 | 5/1990 | Wallach et al. | 395/400 |
| 4,992,930 | 2/1991 | Gilfeather et al. | 395/425 |
| 5,056,002 | 10/1991 | Watanabe | 364/200 |
| 5,168,560 | 12/1992 | Robinson et al. | 395/425 |
| 5,193,163 | 3/1993 | Sanders et al. | 395/425 |
| 5,228,135 | 7/1993 | Ikumi | 395/473 |
| 5,247,649 | 9/1993 | Bandoh | 395/458 |
| 5,251,310 | 10/1993 | Smelser et al. | 395/425 |
| 5,276,828 | 1/1994 | Dion | 395/425 |
| 5,276,835 | 1/1994 | Mohan et al. | 395/425 |
| 5,276,848 | 1/1994 | Gallagher et al. | 395/425 |
| 5,307,477 | 4/1994 | Taylor et al. | 395/425 |
| 5,335,335 | 8/1994 | Jackson et al. | 395/425 |
| 5,339,399 | 8/1994 | Lee et al. | 395/425 |
| 5,515,518 | 5/1996 | Stiles et al. | 395/452 |

FOREIGN PATENT DOCUMENTS

| | | |
|---|---|---|
| 0396940A1 | 11/1990 | European Pat. Off. . |
| 0439952A2 | 8/1991 | European Pat. Off. . |
| WO90/00285 | 1/1990 | WIPO . |

OTHER PUBLICATIONS

"An On–Chip 72K Pseudo Two–Port Cache Memory Subsystem" by S. C–M. Chuang et al. and published in 1990 Symposium on VLSI Circuits: Digest of Technical Papers, Jun. 7–9, 1990.

"Multiprocessor Cache Synchronization–Issues, Innovations, Evolution" written by Philip Bitar a Alvin M. Despain and published in IEEE Transactions on Computers in 1986, pp. 424 to 433.

"Efficient Synchronization Primitives For Large–Scale Cache–Coherent Multiprocessors" writter J. Goodman, M. Vernon, and P. Woest; published in the ASPLOS–III Proceedings in 1989, pp. 64–75.

*Primary Examiner*—Reba I. Elmore
*Attorney, Agent, or Firm*—Keith E. Witek

[57] ABSTRACT

In a multi-processing system (10), a cache controller is implemented to efficiently process collisions which occur when a predetermined address location in a data memory (26) is simultaneously accessed by two processors (20, 21). The cache controller is formed by both a cache control logic circuit (34) and a tag unit (36). In the tag unit (36), a snoop tag cache (40) and a data tag cache (42) respectively indicate whether a snooped value or an accessed data value is stored in data memory (26). A status bit array (41) provides status information for both tag caches (40, 42). By configuring the array (41) to store status information for both snoop and data tag caches (40, 42), status information is "forwarded" between tag caches (40, 42) when a collision occurs. Additionally, the cache controller modifies the timing of each of the accesses such that the status information may be "forwarded" more easily. The timing modification is also referred to as "resource pipelining."

7 Claims, 9 Drawing Sheets

CACHE CONTROLLER FOR PROCESSING SIMULTANEOUS CACHE ACCESSES

This application is a continuation of prior application Ser. No. 07/829,114, filed Jan. 31, 1992, abandoned.

CROSS REFERENCE TO RELATED APPLICATION

This application is related to a commonly assigned copending patent application filed simultaneously herewith and entitled:

"A METHOD FOR PERFORMING CACHE ACCESSES WITH A PIPELINED BUS" by Gene W. Shen et al., Ser. No. 07/829,095.

FIELD OF THE INVENTION

This invention relates generally to a cache memory system, and more particularly to a cache controller in a cache memory system.

BACKGROUND OF THE INVENTION

In the electronics industry, multi-processing systems have been developed to enable a user of a system to manipulate and process information more quickly and efficiently. A multi-processing system generally includes two or more data processors which are interconnected with a system interface bus to a shared memory array. Each of the data processors may contain a data cache to reduce the amount of data transferred between each component of the multi-processing system and to improve access times from the data processors to the memory array. Generally, the data cache includes a cache controller, a data tag cache, and a snoop tag cache. The data tag cache unit services internal memory requests from execution units in the data processor to determine whether an information value is currently being stored in the data cache. The data tag cache may also indicate if an information value stored in the data cache is valid. The snoop tag cache unit monitors, or "snoops," transactions on the system interface bus to maintain data coherency between each element of the multi-processing system. Each information value modified by an external processor must be snooped in order to maintain data coherency throughout the entire multi-processing system. Additionally, the cache controller controls operation of the data cache.

In multi-processing systems, conflicts may occur during reading and writing operations which use the data tag cache and the snoop tag cache. In a first example, assume a first data processor attempts to read data currently resident in the data cache and a second data processor attempts to simultaneously change that data. When the first data processor reads the data, a predetermined address in the data cache tag is accessed to indicate, or "point to" an address location of the data in the data cache. Similarly, when the second data processor attempts to change that data, the snoop tag cache also points to the address location in the data cache. When the same address location is accessed by the data tag cache and the snoop tag cache simultaneously, a potential for an error, or "collision" occurs. In this case, when the first data processor attempts to read the cached data at a predetermined address in the data cache tag while the second data processor attempts to write to the address, a "read/write" collision occurs.

A second example of a conflict, referred to as a "dual write collision," occurs when both data processors attempt to modify the same data simultaneously. A "dual read collision" in which both data processors attempt to read the same data may also occur. However, because a read operation generally does not modify the contents of the data cache, no error occurs. In some situations, a read operation may modify state information corresponding to the data.

Read/write and dual write collisions adversely affect the operation and performance of a multi-processing system. When a collision occurs, the cache controller typically processes the collision as an error. Therefore, rather than performing a function specified by a user of the multi-processing system, the cache controller must enable the data processor to respond to the error and subsequently provide an indeterminate response to the user. Additionally, read/write and dual write collisions are difficult to predict in a multi-processing system and, therefore, may not be easily anticipated or corrected. For more information relating to techniques used to control collisions in a multi-processing system, refer to an article entitled "Multiprocessor Cache Synchronization-Issues, Innovations, Evolution" and published on pages 424 through 433 of the IEEE Transactions on Computers in 1986. The article was written by Philip Bitar and Alvin M. Despain. Additionally, refer to a technical paper entitled "Efficient Synchronization Primitives for Large-Scale Cache-Coherent Multiprocessors" and published in the proceedings of the Third International Conference on Architectural Support for Programming Languages and Operating System on pages 64 through 75. The paper was written by James R. Goodman, Mary K. Vernon, and Philip J. Woest.

Therefore, a need exists for a cache controller which is able to resolve read/write and dual write collisions quickly and efficiently. The cache controller should also be able to fully execute each type of operation specified during a collision. For example, in a read/write collision, both the read and the write operations should be executed to provide a correct result.

SUMMARY OF THE INVENTION

The previously mentioned needs are fulfilled with the present invention. Accordingly, there is provided, in one form, a cache controller. The cache controller includes a first bus interface for coupling the cache controller to a first bus and a second bus interface for coupling the cache controller to a second bus. A first cache tag memory array is coupled to the first bus interface. The first cache tag memory array has a predetermined number of entries, each of which corresponds to an unique entry in a data memory array external to the cache controller. A second cache tag memory array is coupled to the second bus interface means. The second cache tag memory array includes the predetermined number of entries, each of which corresponds to an unique entry in the data memory array. A status memory array is coupled to both the first and second cache tag memory arrays. The status memory array comprises the predetermined number of entries, each of which corresponds to an unique entry in the first cache tag memory array and to an unique entry in the second cache tag memory array.

These and other features, and advantages, will be more clearly understood from the following detailed description taken in conjunction with the accompanying drawing. It is important to note the drawings are not intended to represent the only form of the invention.

DETAILED DESCRIPTION OF A PREFERRED EMBODIMENT

The present invention provides a cache controller for a multi-processing system. In the implementation of the invention described herein, the cache controller efficiently resolves "collisions" which occur when a particular address location in a data cache memory array is accessed by a plurality of data processors simultaneously. A first technique referred to as "resource pipelining" and a second technique referred to as "status forwarding" are each used to allow the cache controller to efficiently resolve such collision situations. Both techniques will be subsequently discussed in further detail. Additionally, by splitting a pipelined bus into separate address and data tenures and recognizing each as a separate tenure, more information may be processed. As well, snoop operations of a particular cache may be performed without being lost or slowed by write operations to the same cache. The cache controller also maintains data coherency in the data cache memory array and any other memory array in the multi-processing system.

Figure 1:
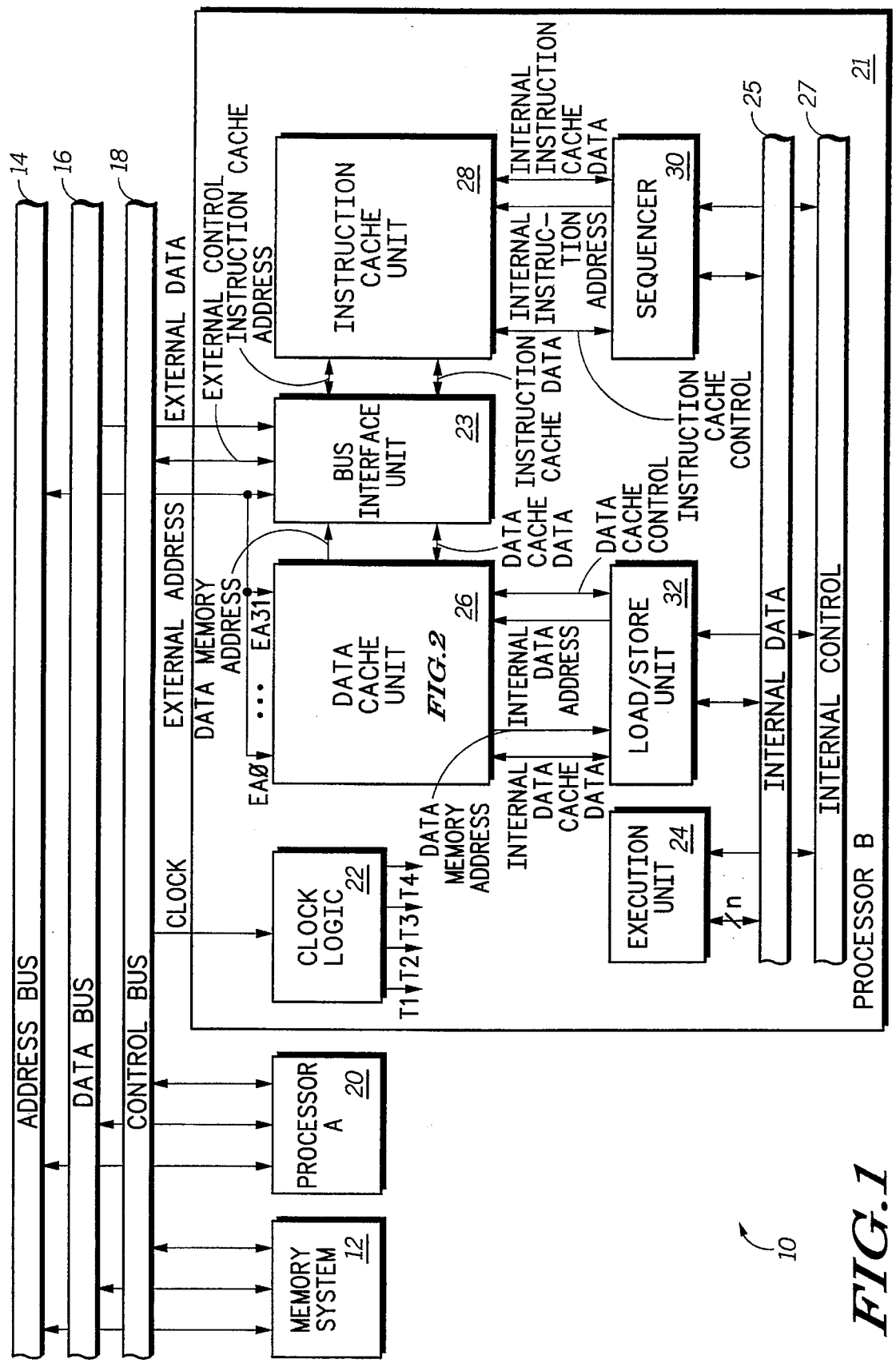
FIG. 1 illustrates in block diagram form a multi-processing system having a data cache unit in accordance with the present invention.

FIG. 1 illustrates a multi-processing system 10 which provides an implementation of the claimed invention as described herein. Of course, multi-processing system 10 is provided by way of example only and is not intended to represent the only implementation of the claimed invention. Multi-processing system 10 generally includes a memory system 12, a processor A 20, and a processor B 21. In one particular embodiment, both processor A 20 and processor B 21 may be implemented as a single integrated circuit such as a MC88110 which is available from Motorola, Inc. of Austin, Tex. The MC88110 is able to function both in a uni-processor and multi-processor environment. As is explained below, the MC88110 also provides a system for efficiently performing cache accesses, even in a multi-processing situation in which an address location in an on-board data cache is accessed simultaneously by two or more data processors.

Although both processor A 20 and processor B 21 are implemented as MC88110 RISC processors in this embodiment of the invention, only processor B 21 is shown in detail. Processor B 21 generally includes a clock logic circuit 22, a bus interface unit 23, an execution unit 24, a data cache unit 26, an instruction cache unit 28, a sequencer 30, and a load/store unit 32.

During operation, an Address Bus 14 is connected to an address input of each of memory system 12, processor A 20, and processor B 21 to provide a signal labelled "External Address." The External Address signal transfers an external address which is typically n bits wide, where n is an integer. In the example described herein, the external address is thirty-two bits wide, and, therefore, n is also equal to thirty-two. Similarly, a Data Bus 16 is connected to a data input of each of memory system 12, processor A 20, and processor B 21 to provide an "External Data" signal. The External Data signal transfers an external data value which is typically m bits wide, where m is an integer. As described herein, the external data value is sixty-four bits wide and, therefore, m is also equal to sixty-four. Additionally, a Control Bus 18 provides a plurality of control values to a first input of each of memory system 12, processor A 20, and processor B 21. The plurality of control values is necessary for each of memory system 12, processor A 20, and processor B 21 to function correctly together. Control Bus 18 provides a first portion and a second portion of the plurality of control values to memory system 12 and to processor A 20, respectively. Similarly, Control Bus 18 provides a third portion of the plurality of control values to processor B 21 via a signal labelled "External Control."

In processor B 21, the external address value is provided to a first plurality of address inputs of both data cache unit 26 and bus interface unit 23. Each of the plurality of inputs of data cache unit 26 receives a predetermined bit of the external address value and is labelled respectively. For example, a first one of the plurality of address inputs is labelled "EA0" and receives bit zero of the external address. Similarly, a last one of the plurality of address inputs is labelled "EA31" and is dedicated to receive bit thirty-one of the external address. Additionally, the external data value transferred via Data Bus 16 is provided to a bidirectional data terminal of bus interface unit 23. The External Control signal is also provided to bus interface unit 23.

Bus interface unit 23 serves as an interface between processor B 21 and the remaining components of multi-processing system 10. Bus interface unit 23 is coupled to data cache unit 26 to provide an external address value and receive an external data value. The external address value is provided via a Data Cache Address bus and the external data value is received via a Data Cache Data bus. Similarly, bus interface unit 23 is coupled to instruction cache unit 28 to provide the external address value via an Instruction Cache Address bus and the external data value via an Instruction Cache Data bus. The External Control signal enables bus interface unit 23 to communicate either address or data information at an appropriate point in time.

Additionally, a "Clock" signal, transferred via Control bus 18, is provided to a clock logic circuit 22. Clock logic circuit 22 provides a plurality of clock signals respectively labelled "T1," "T2," "T3," and "T4." Each of the plurality of clock signals represents a single phase of a four phase clock period and is provided to each of the respective components of processor B 21. Although the routing of each of the clock signals is not shown in detail in FIG. 1, such routing is commonly known and should be readily understood by one with ordinary skill in the art.

Execution unit 24 communicates both a n-bit wide internal data value and a plurality of control signals to a bidirectional Internal Data bus 25 and a bidirectional Internal Control bus 27, respectively. Internal Data bus 25 is connected to a first data input of both load/store unit 32 and sequencer 30 to transfer the internal data value to and from execution unit 24. Similarly, Internal Control bus 26 is connected to a plurality of control inputs of both load/store unit 32 and sequencer 30 to transfer the plurality of internal control signals to and from execution unit 24.

Sequencer 30 is connected to a plurality of address inputs of instruction cache unit 28 to provide an n bit wide signal labelled "Internal Instruction Address." Although the Internal Instruction Address signal is the same width as the external address value in this implementation of the invention, the Internal Instruction Address signal might also have a different bit width than the external address value. Sequencer 30 is also connected to a second plurality of bidirectional data inputs of instruction cache unit 28 to provide a signal labelled "Internal Instruction Cache Data." The Internal Instruction Cache Data signal communicates internal data between sequencer 30 and instruction cache unit 28. Additionally, sequencer 30 is connected to a plurality of bidirectional control inputs of instruction cache unit 28 to provide a plurality of control signals collectively labelled "Instruction Cache Control."

Instruction cache unit 28 is accessed during execution of a software routine to quickly provide instructions and reduce an amount of processing time generally required to fetch instructions. In response to the internal data and control signals provided by execution unit 24, sequencer 30 accesses a predetermined address location in instruction cache unit 28 via the Internal Instruction Address signal such that a next instruction to be processed by execution unit 24 may be provided. If an instruction stored at the predetermined address location is valid and is correctly accessed, the instruction cache unit 28 provides both the accessed instruction and a next instruction to sequencer 30 via the Internal Instruction Cache Data signal. Sequencer 30 then provides the two instructions to execution unit 24 to be processed. If the instruction had not been stored in instruction cache unit 28, execution unit 24 would have been required to access the instruction from another source (not shown herein).

Load/store unit 32 is connected to a second plurality of address inputs of data cache unit 26 to provide the Internal Data Address signal. Load/store unit 32 is also connected to a second plurality of bidirectional data inputs of data cache unit 26 to provide an m bit wide signal labelled "Internal Data Cache Data." Again, although the Internal Data Cache Data signal is the same width as the external data value in this implementation of the invention, the Internal Data Cache Data signal might also have a different bit width than the external data value. Additionally, load/store unit 32 is connected to a second plurality of bidirectional control terminals of data cache unit 26 to communicate internal control information collectively labelled "Data Cache Control." Load/store unit 32 provides control, address, and data information at predetermined times such that no errors occur during accesses to tag unit 36. Standard logic circuitry may be used to implement load/store unit 32 in a manner determined by a user of multi-processing system 10.

Figure 2:
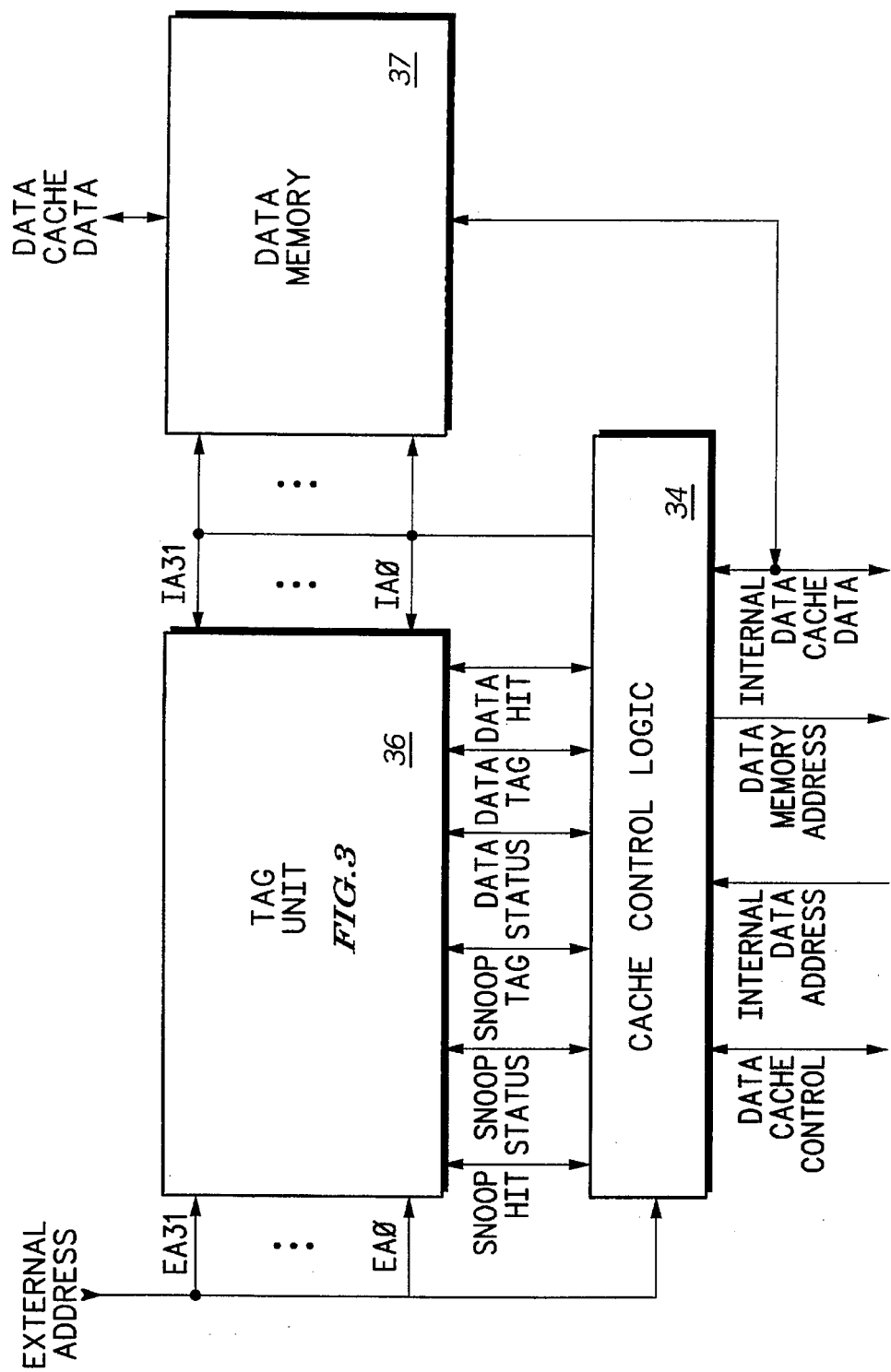
FIG. 2 illustrates in block diagram form the data cache unit of FIG. 1.

Data cache unit 26 is illustrated in more detail in FIG. 2. Data cache unit 26 generally includes a cache control logic circuit 34, a tag unit 36, and a data memory 37. Cache control logic 34 and tag unit 36 form a cache controller which controls operation of data cache unit 26 to insure that data coherency is maintained between processor B 21 and any external data processor, such as processor A 20. Data memory 37 is a memory array for storing data which is accessed from data cache unit 26 most recently. The Data Cache Address bus provides an external address value between data memory 37 and bus interface unit 23. The external address value corresponds to an unique location in data memory 37. Similarly, the Data Cache Data bus communicates an external data value between data memory 37 and bus interface unit 23. The external data value corresponds to a data value stored in data memory 37.

In data cache unit 26, each of the Data Cache Control, the Internal Address, and the Internal Data Cache Data signals is provided to a respective input of cache control logic circuit 32. The Internal Data Cache Data signal is also provided to a first bidirectional data input of data memory 37. Additionally, cache control logic circuit 32 provides a signal labelled "Data Memory Address" to load/store unit 32.

Cache control logic circuit 34 is connected to tag unit 36 to provide a plurality of signals respectively labelled "Snoop Hit," "Snoop Status," "Data Status," and "Data Hit." The function of each of these signals will be discussed in more detail later. Additionally, tag unit 36 provides both a data tag value and a snoop tag value to cache control logic 34 in response to the plurality of signals mentioned above.

Cache control logic 34 is also connected to a plurality of inputs of both tag unit 36 and data memory 37 to provide the Internal Address signal. Each of the plurality of inputs corresponds to a predetermined bit of the Internal Address signal. For example, bit zero of the Internal Address signal is provided to a first input labelled "IA0." Similarly, a last bit of the Internal Address signal is provided to a last input labelled "IA31."

The External Address signal provides the plurality of bits EA0 through EA31 to a plurality of external address inputs of both tag unit 36 and cache control logic 34. Cache control logic 34 is implemented using standard logic circuit to perform predetermined operations as will be discussed later. Tag unit 36 is illustrated in more detail in FIG. 3.

Figure 3:
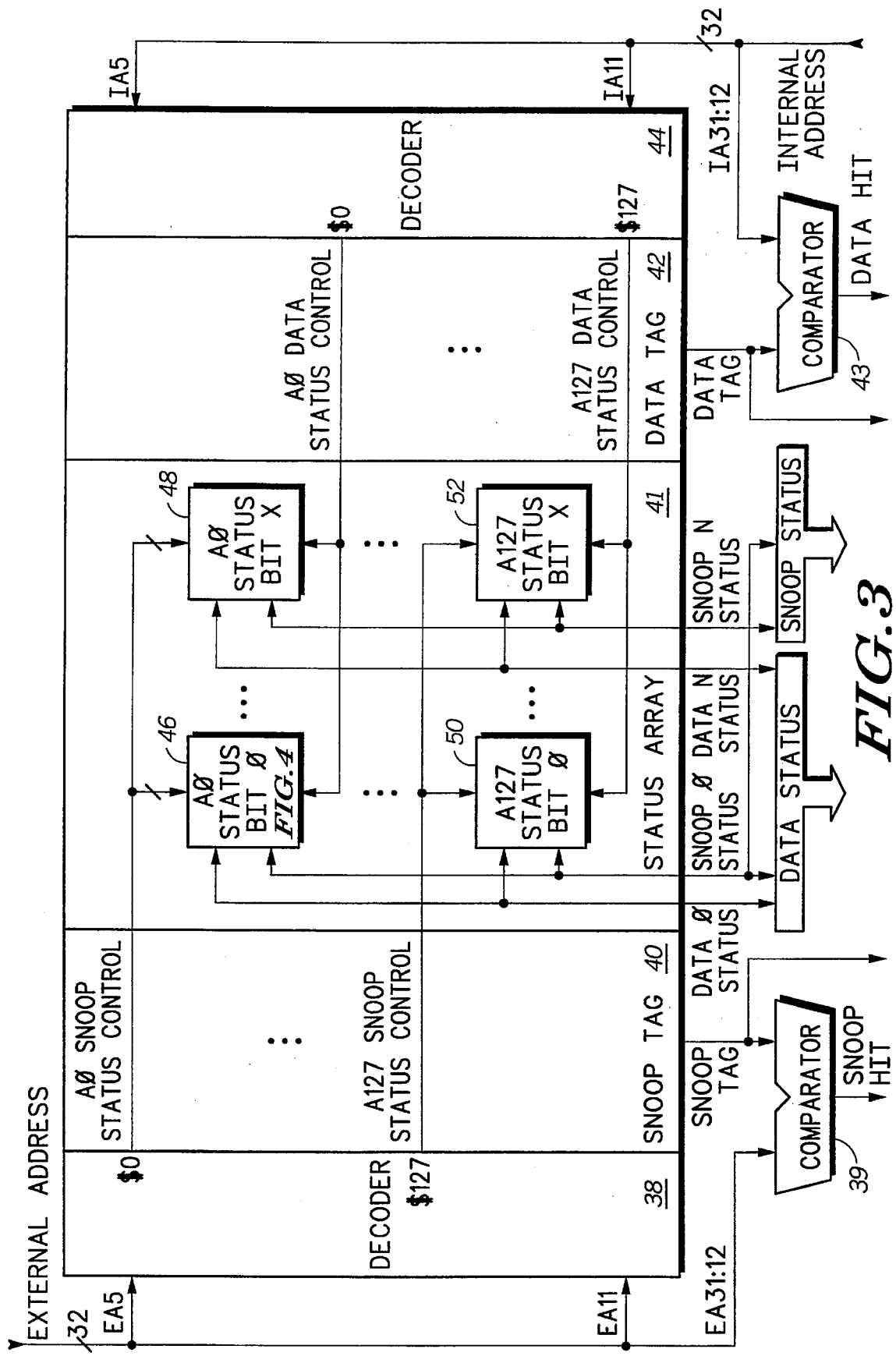
FIG. 3 illustrates in block diagram form a tag unit of FIG. 2 in accordance with the present invention.

In FIG. 3, tag unit 36 generally includes a snoop decoder 38, a snoop comparator 39, a snoop tag cache 40, a status array 41, a data tag cache 42, a data comparator 43, and a data decoder 44. Status array 41 has a plurality of status bit cells where each row of status bits provides a status information value of a single tag value of both the snoop tag cache 40 and the data tag cache 42. For example, a first tag value of both snoop tag cache 40 and data tag cache 42 is accessed at hexadecimal address $0 of both tag caches. Therefore, status bit cells corresponding to the first tag values are respectively labelled "A0 Status Bit 0" through "A0 Status Bit X," where X is an integer number. Likewise for the last tag value of both snoop tag cache 40 and data tag cache 42 in this embodiment of the invention, a corresponding plurality of status bit cells are respectively labelled "A127 Status Bit 0" through "A127 Status Bit X."

To more fully understand operation of tag unit 36, assume that processor A 20 modifies a data value stored at a predetermined address in memory system 12. To maintain data coherency, processor B 21 snoops the address value to determine whether the data value is stored in its internal memory, data memory 37. Rather than testing data memory 37 to determine if the data value is stored therein, processor B 21 provides an internal address corresponding to the data value to snoop tag cache 40 in tag unit 36. Snoop tag cache 40 stores a plurality of snoop tag values, each of which corresponds to a predetermined address location in data cache 26. The snoop tag value is then compared to a portion of the address snooped by processor B 21 to determine whether the data value is stored in data memory 37.

In tag unit 36, bits five through eleven of the External Address signal are decoded by snoop decoder 38 to identify a predetermined hexadecimal address at which a corresponding snoop tag value is stored in snoop tag cache 40. When a hexadecimal address in snoop tag cache 40 is identified and asserted, a snoop tag value is provided to both a first input of snoop comparator 39 and cache control logic circuit 34. Comparator 39 then compares the snoop tag value to a predetermined portion of the External Address signal. In the example described herein, bits twelve through thirty-one of the External Address are provided to the second input of snoop comparator 39. The Snoop Hit signal is output by snoop comparator 39 to indicate whether the accessed value is stored in snoop tag cache 40. The snoop tag value is then provided to cache control unit 34 to be processed in accordance with the value of the Snoop Hit signal.

Additionally, status control bits are concurrently provided to a respective one of a plurality of status bit cells corresponding to the accessed address. For example, if bits five through eleven of the External Address signal are decoded to identify that hexadecimal address $0 should be accessed, a A0 Snoop Status Control signal is asserted. Subsequently, A0 status bit 0 46 through A0 status bit X 48 are enabled to either modify status information corresponding to the data value at the accessed address. Similarly, when bits five through eleven of the External Address signal are decoded to identify that hexadecimal address $127 is accessed, a A127 Snoop Status Control signal is asserted to enable A127 status bit 0 50 through A127 status bit X 52.

Similarly, assume that processor B 21 modifies a data value stored at a predetermined address location of data memory 37. To modify the data value in data memory 37, load/store unit 32 provides the predetermined address to cache control logic 34. Data tag cache 42 stores a plurality of data tag values, each of which corresponds to a predetermined address location of data cache 26. The data tag value is then compared to a portion of the address provided by the Internal Address signal to determine whether the data value is stored in data cache 26. Additionally, the data tag value is also provided to cache control logic circuit 34 where it may be subsequently provided to load/store unit 32 via the Data Memory Address signal.

In tag unit 36, bits five through eleven of the Internal Address signal are decoded by data decoder 44 to identify a predetermined hexadecimal address at which a corresponding data tag value is stored in data tag cache 40. When a hexadecimal address in data tag cache 42 is asserted, a data tag value is provided to a first input of data comparator 43. Additionally, a plurality of status control bits are concurrently provided to a plurality of status bit cells corresponding to the accessed address. For example, if bits five through eleven of the Internal Data Address signal are decoded to identify that hexadecimal address $0 should be accessed, a A0 Data Status Control signal is provided to A0 status bit 0 46 through A0 status bit X 48. Similarly, if bits five through eleven of the Internal Address signal are decoded to identify that hexadecimal address $127 should be accessed, a A127 Data Status Control signal is provided to A127 status bit 0 50 through A127 status bit X 52.

Control of each of the plurality of status bits is provided by cache control logic 34 via the Data Status signal and the Snoop Status signal. For example, cache control logic 34 provides both a signal labelled "Data 0 Status" and a signal labelled "Snoop 0 Status" to A0 status bit 0 46 through A127 status bit 0 50. Similarly, cache control logic 34 provides both a signal labelled "Data X Status" and a signal labelled "Snoop X Status" to A0 status bit X 48 through A127 status bit X 52.

Because each of the plurality of status bits is shared between snoop tag cache 40 and data tag cache 42, data coherency is ensured. If a snoop tag value in snoop tag cache 40 is modified, corresponding status bits in status array 41 are also modified. Because the corresponding status bits are also shared by data tag cache 42, any modification to the status bits is reflected by a corresponding data tag value. Similarly, any modifications to a data tag value in data tag cache 42 is reflected in snoop tag cache 40. By sharing status bits between both data tag values and snoop tag values, any modification to the status bits may be concurrently reflected in the data tag cache 42 and snoop tag cache 40, respectively.

In the implementation of the invention as described herein, X is equal to three and there are three status bit cells which determine a possible state of an accessed value. The three status bits determine whether an accessed data value is valid, whether it has been modified with respect to external memory such as memory 12, and whether is is exclusively "owned" by a single processor or shared with other processors. If an accessed value is exclusively owned by a single processor, no other processor may modify that value without first gaining ownership of that value.

Additionally, a total of four possible states may exist for any accessed value. In a first state, the three status bit cells define an Invalid state. If the accessed value is in the Invalid state, the accessed value is stale, or is no longer the most recent copy of the data, and should not be used. In a second state, the three status bit cells define a Shared-Unmodified state. If the accessed value is in the Shared-Unmodified state, the accessed value is shared among processors, so other caches may have a copy of this value. However, the accessed value is unmodified with respect to the external memory. A third state is defined as an Exclusive Unmodified state. In the Exclusive Unmodified state, only one processor has a copy of the accessed value in it's data cache. Additionally, the accessed value is unmodified with respect to the external memory. In a fourth, the three status bits define an Exclusive Modified state. In the Exclusive Modified state, only one processor has a copy of the accessed value in it's data cache. Additionally, the accessed value is "dirty," or has been modified with respect to the external memory. During a data cache access, the state of the accessed value may change state depending on the type of access and the result of the access (e.g. did the access result in a hit or a miss).

Figure 4:
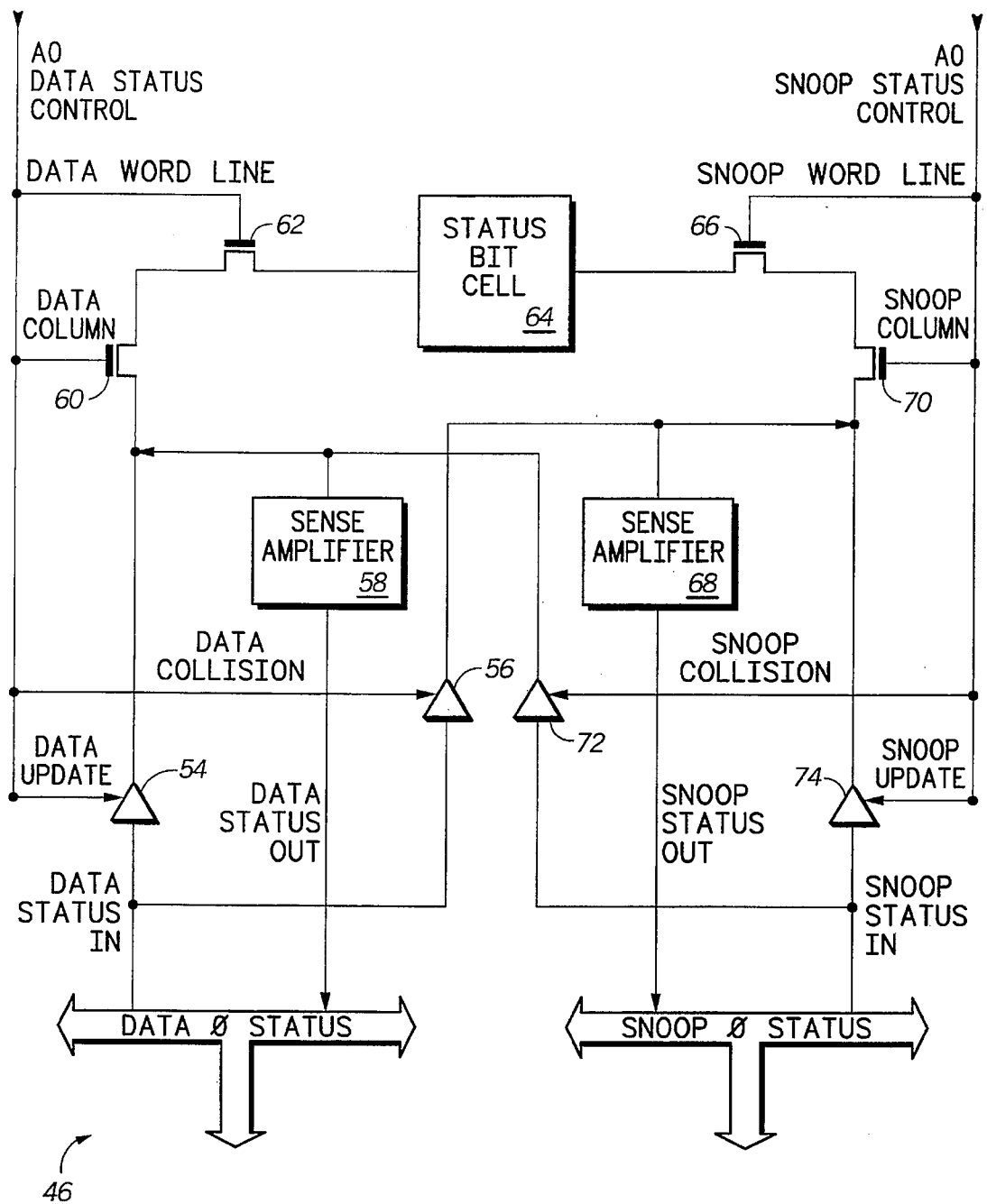
FIG. 4 illustrates in partial logic diagram form a status array bit cell circuit of FIG. 3.

When implemented to reflect a state of an accessed value, each of the plurality of status bit cells uses the same logic circuitry. Therefore, for purposes of illustration, only A0 status bit 0 46 is illustrated in FIG. 4. A0 status bit 0 46 generally includes a driver 54, a driver 56, a sense amplifier 58, a transistor 60, a transistor 62, a status bit cell 64, a transistor 66, a sense amplifier 68, a transistor 70, a driver 72, and a driver 74.

The Data 0 Status signal is connected to a data input of both driver 54 and driver 56 to provide a signal labelled "Data Status In." The plurality of A0 Data Status Control signals is connected to a control terminal of transistor 62 to provide a Data Word Line control signal. During a write operation, the Data Word Line control signal is asserted when the Internal Address signal is decoded to indicate that hexadecimal address $0 of data tag cache 42 is selected. Additionally, the plurality of A0 Data Status Control signals is connected to a control electrode of transistor 60 to provide a Data Column control signal. The Data Column control signal and the Data Word control signal collectively indicate a status bit cell which should be modified. Additionally, the plurality of A0 Data Status Control signals is connected to both a control electrode of driver 56 to provide a Data Collision signal and a control electrode of driver 54 to provide a Data Update signal. The Data Collision signal indicates whether a collision has occurred and the same memory location has been simultaneously accessed. The Data Update signal indicates whether a data tag value in data tag cache should be modified. The Snoop 0 Status signal is connected to a data input of both driver 74 and driver 72 to provide a signal labelled "Snoop Status In." The plurality of A0 Snoop Status Control signals is connected to a control terminal of transistor 66 to provide a Snoop Word Line control signal. During a snoop operation, the Snoop Word Line control signal is asserted when the External Address signal is decoded to indicate that hexadecimal address $0 of snoop tag cache 40 is selected. Additionally, the plurality of A0 Snoop Status Control signals is connected to a control electrode of transistor 70 to provide a Snoop Column control signal. The Snoop Column control signal and the Snoop Word control signal collectively indicate a status bit cell which should be modified. Additionally, the plurality of A0 Snoop Status Control signals is connected to both a control electrode of driver 72 to provide a Snoop Collision signal and a control electrode of driver 74 to provide a Snoop Update signal. The Snoop Update signal indicates whether a snoop tag value in the snoop tag cache should be modified.

An output of driver 54 and an output of driver 72 are both connected to a first current electrode of transistor 60. A second current electrode of transistor 60 is connected to a first current electrode of transistor 62. A second current electrode of transistor 62 is connected to a first bidirectional terminal of status bit cell 64. An output of driver 56 and an an output of driver 74 are both connected to a first current electrode of transistor 70. A second current electrode of transistor is connected to a first current electrode of transistor 66. A second current electrode of transistor 66 is connected to a second bidirectional terminal of status bit cell 64. Additionally, an output of driver 56 is also connected to sense amplifier 68. An output of sense amplifier is coupled to the Snoop 0 States signal to provide a signal labelled "Snoop Status Out" to cache control logic 34. An output of driver 72 is also coupled to an input of sense amplifier 58. An output of sense amplifier 58 is provided to Data 0 Status signal to provide a signal labelled "Data Status Out" to cache control logic 34. During operation, cache control logic 34 receives and processes each of the Snoop Status Out and Data Status Out signals to allow two accesses to a same address location to both be accurately processed in an efficient manner.

As an example, assume that both processor A 20 and processor B 21 concurrently modify a data value stored at a predetermined address location in data cache 26. As previously mentioned, when an information value is accessed in either data tag cache 41 or snoop tag cache 40, a state of the information value is modified. Therefore, a value of the status bits may be "forwarded" to accurately reflect modifications which occur during simultaneous accesses.

For example, assume that hexadecimal address $0 is concurrently written in data tag cache 42 and read in snoop tag cache 40. Because hexadecimal address $0 is accessed, both the Data Word Line and Snoop Word Line signals are asserted. The Data Column and Snoop Column signals are also asserted. During a write operation, the Data Update signal is asserted to enable driver 54 to receive a modified status bit via the Data Status In signal. Additionally, the Data Collision is asserted to indicate that a "collision" occurred and the same address was concurrently accessed by two different processors. Neither the Snoop Update or Snoop Collision signals are asserted as a snoop tag value in the snoop tag cache 40 is not being accessed.

When each of the signals is properly asserted, the modified status bit is provided to status bit cell 64 to be stored for subsequent use. Additionally, driver 56 drives the modified status bit to sense amplifier 68 where the modified status bit is provided to cache control logic 34 rather than the status bit previously stored in status bit cell 64.

Similarly, assume that hexadecimal address $0 is concurrently written in snoop tag cache 40 and read in data tag cache 42. Again, the Data Word Line, Snoop Word Line, Data Column, and Snoop Column signals are all asserted. Because a new snoop tag value is written, the Snoop Update signal is asserted to enable driver 74 to receive a modified status bit via the Snoop Status In signal. Additionally, the Snoop Collision is asserted to indicate that a "read/write" collision occurred and the same address was concurrently accessed by two different processors. Neither the Data Update or Data Collision signals are asserted as a data tag value in data tag cache 42 is not being modified.

Again, when each of the signals is properly asserted, the modified status bit is provided to status bit cell 64 to be stored for subsequent use. Additionally, driver 72 drives the modified status bit to sense amplifier 58 where the modified status bit is provided to cache control logic 34 rather than the status bit previously stored in status bit cell 64.

During operation, multi-processing system 10 is able to efficiently perform snoop, and read or write operations concurrently without a loss of either functionality or performance. The structure of the status bit cells together with two techniques respectively referred to as "resource pipelining" and "split bus tenures" allow multi-processing system 10 to perform efficiently during a collision. For example, assume that processor B 21 initiates an operation to write a new value in a first memory storage location of data memory 37 at the same time that processor A 20 also modifies a data value stored at a second memory location. Processor B 21 must, therefore, also snoop the data value modified by processor A 20 to determine if it is stored in data memory 37. If the data value is stored in data memory 37, the data value must also be modified therein to maintain data coherency. In other implementations of cache controllers for multi-processing systems, both a write and a snoop operation to the same memory storage location could not generally be processed concurrently. Typically, the cache controller would provide an indeterminate response for both operations.

However, in the implementation of the invention described herein, processor B 21 uses split bus tenures to simultaneously process both snoop and write operations with no loss in performance. A timing diagram illustrating split bus tenures is shown in FIG. 5.

Figure 5:
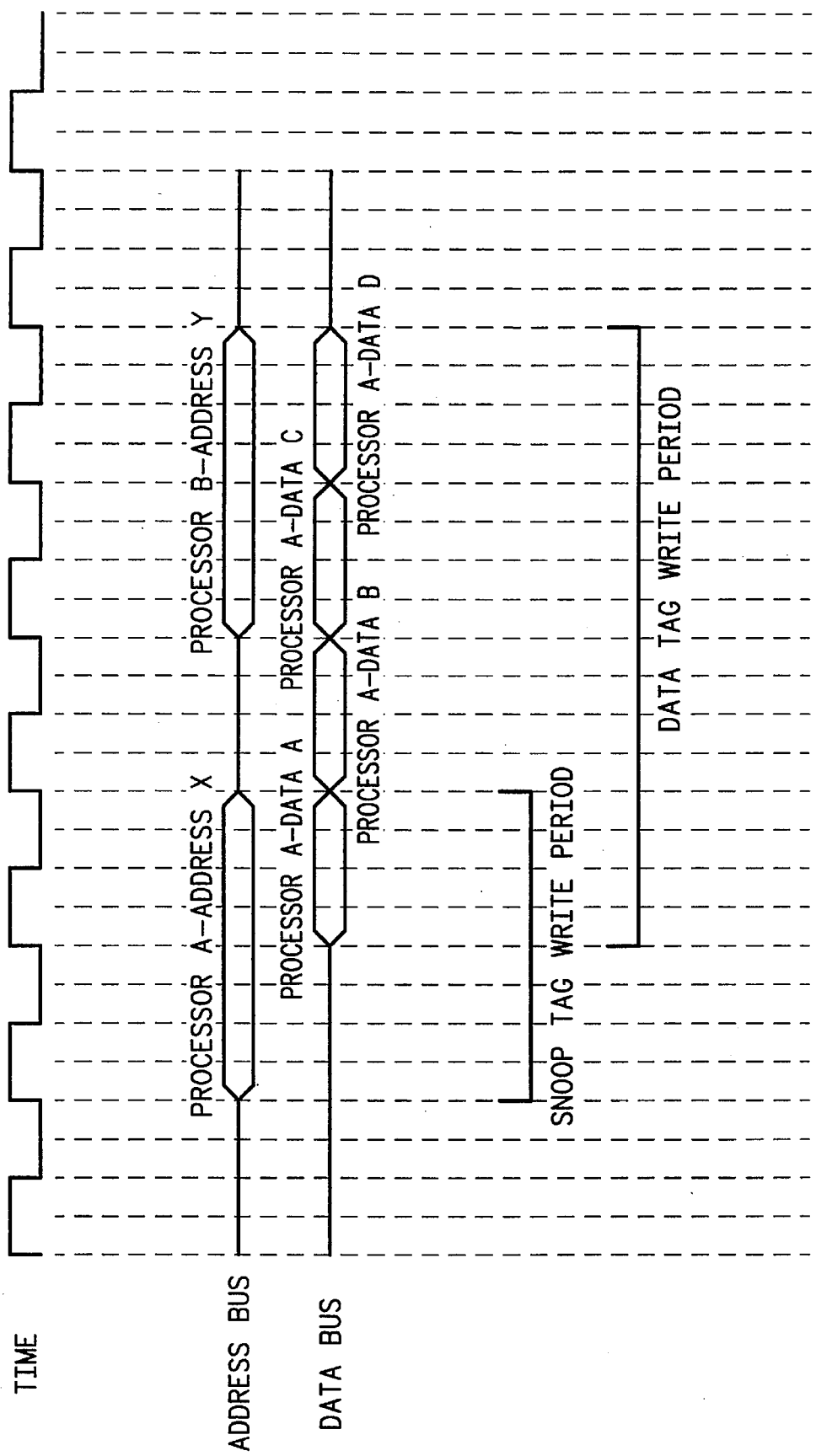
FIG. 5 illustrates in timing diagram form address and data bus activity during cache tag write operations in accordance with the present invention.

In FIG. 5, time is represented at the top of the timing diagram as a series of clock periods. In FIG. 5, assume that processor B 21 gains ownership of Address Bus 14 to access an information value from memory circuit 12. Subsequently, processor B 21 provides an Address X value to Address Bus 14 during a period of address tenure. In the timing diagram illustrated in FIG. 5, the address tenure begins at a start of a clock period, and ends two clock periods later at the same clock phase. At a separate data tenure, memory circuit 12 provides a plurality of data values accessed therein by Address X to Data Bus 16. The data values are respective labelled "Data A," "Data B," "Data C," and "Data D." In the example illustrated herein, the data tenure begins one clock period after the address tenure begins and transfers one of the plurality of data values each clock period until finished.

During the address tenure when processor B 21 has ownership of Address Bus 14, no other processor is allowed to modify a data value in memory system 12. Because processor B 21 has ownership of Address Bus 14, no other processor in multi-processing system 10 is allowed to generate a snoop access. Therefore, processor B 21 is not required to snoop any external transactions during the address tenure and may modify a snoop value in it's snoop tag cache without contention from an external source.

Similarly, during the data tenure, a data tag value may be modified within data tag cache 42 of tag unit 36 when processor B 21 has ownership of Data Bus 16. Cache control logic 34 in processor B 21 ensures that a data tag value will not be requested until changes to the data tag values are fully executed. To further improve efficiency of such a transaction, processor A 20 may access an Address Y from memory circuit 12 before processor B 21 has completed the data tenure. By overlapping address and data tenures, more functions may be processed concurrently. Additionally, during the data tenure when processor B 21 does not have ownership of Data Bus 16, processor B 21 is able to "decouple" from multi-processing system 10. When decoupled, processor B 21 is able to execute functions without monitoring external transactions. For example, if execution unit 24 of processor B 21 requests a data value which is not stored in data memory 37, a "miss" occurs. When a miss occurs, the data value is accessed from memory system 12. During a period of time in which the data value is accessed from memory system 12, processor B 21 is decoupled from multi-processing system 10 and is able to service other internal requests.

Furthermore, a method referred to as a "Resource Pipeline Execution" is also used to modify a typical pipeline data transfer method such as "Lock Step Pipeline Execution" to enhance the performance of the cache controller. A timing diagram illustrating the difference between Lock Step Pipelining and Resource Pipelining is provided in FIG. 6.

Figure 6:
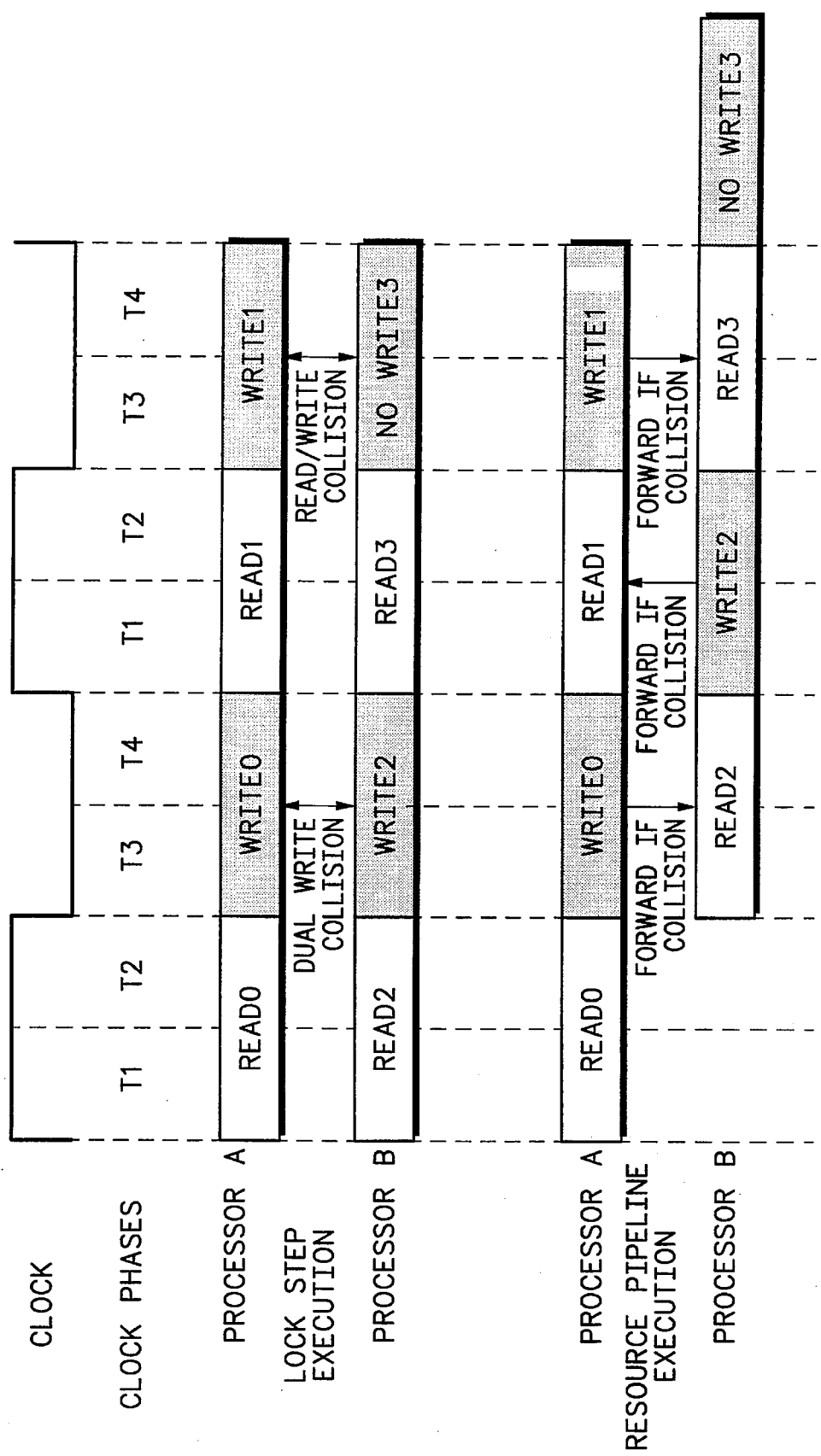
FIG. 6 illustrates in timing diagram form both a typical pipelined instruction flow and a resource pipelined instruction flow in accordance with the present invention.

A Clock signal is illustrated at the top of FIG. 6. Each period of the clock is divided into four phases, respectively labelled "T1," "T2," "T3," and "T4." Each access of a tag value in either snoop tag cache 40 or data tag cache 42 is completed in one clock period. In the Lock Step Pipeline Execution method, collisions (indicated by the shaded areas) occur when two data processors access an information value simultaneously. When both processor A and processor B read an information value during clock phases T1 and T2, the state of the information value is not modified and, therefore, the information may be read by both processors without contention. However, when processor A attempts to modify an accessed value with a first data value and processor B concurrently attempts to modify the same accessed value with a second data value during clock phases T3 and T4, both processors are attempting to modify the state of the accessed value and contention occurs. When contention occurs, an erroneous result might be generated. Similarly, when processor A attempts to write a third data value to the accessed value at the same time that processor B is reading the accessed value, contention again occurs and the state of the accessed value is indeterminate.

However, by using the Resource Pipeline Execution method, collisions are avoided and an address value may be concurrently accessed by two or more processors. In the Resource Pipeline Execution method, a phase of a processor B clock is shifted from a phase of a processor A clock by a predetermined amount of time. In the example described herein, processor A performs read accesses at a first predetermined point in time referred to as "T1" and processor B performs read accesses at a second predetermined point in time referred to as "T2." In the embodiment of the invention described herein, cache control logic 34 of processor B 21 shifts the phase of the processor B clock to ensure that processor B 21 performs read accesses at a later time. Therefore, when processor A modifies the first data value, the plurality of status bit cells previously described forward the modified information such that processor B reads the modified information value, and not a stale information value. Similarly, if the first processor performs a read operation at the same time (T3) that the second processor performs a write operation, the status bits of the modified information value are forwarded such that processor A reads the modified information value.

In each of these examples, resource pipelining, split bus tenures, and the structure of the status bit cells enable tag unit 36 to service at least two accesses of the same memory location without a loss of functionality of efficiency.

Figure 7:
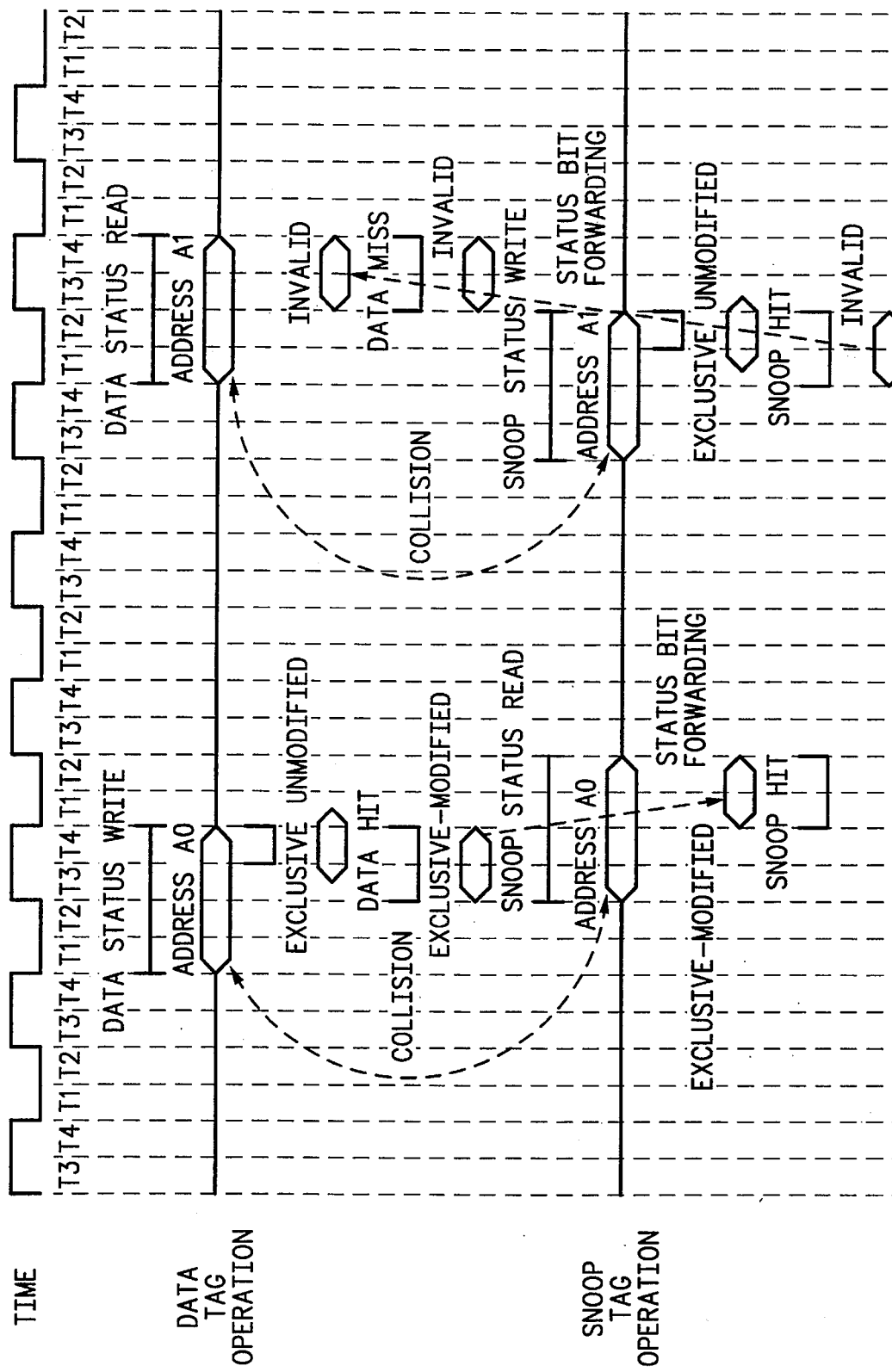
FIG. 7 illustrates in timing diagram form a status flow of both a write/read collision operation and a read/write collision operation in accordance with the present invention.
Figure 8:
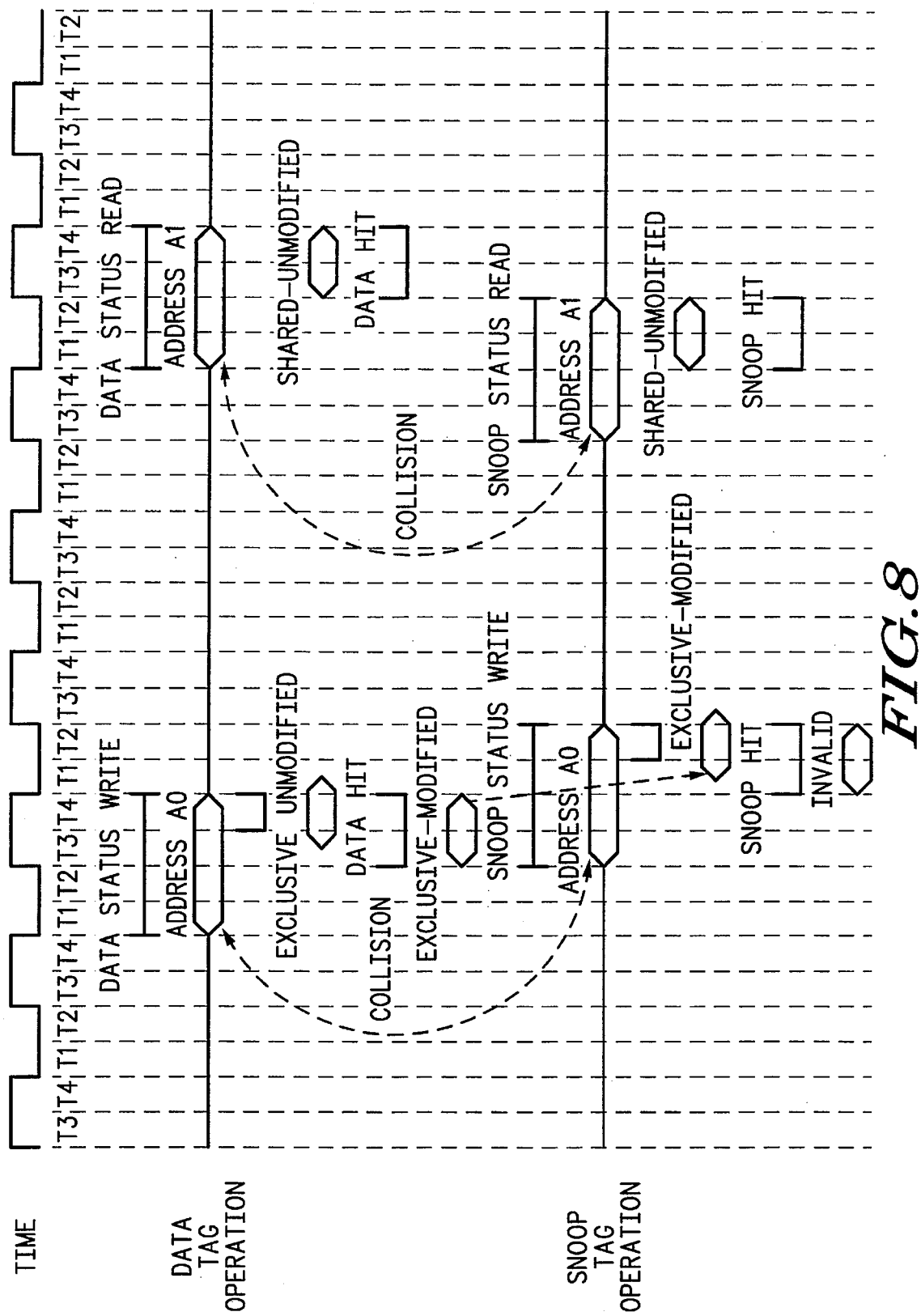
FIG. 8 illustrates in timing diagram form a status flow of both a dual write collision operation and a dual read collision operation in accordance with the present invention.

FIG. 7 and FIG. 8 provide an overview of the performance of tag unit 26 in each type of collision situation. In FIG. 7, a "write/read" collision occurs when a new data tag value is written to address A0 in data tag cache 42 while a snoop tag value at address A0 is read from snoop tag cache 40. Again, a collision occurs when both operations attempt to modify the status bits corresponding to address A0. When the collision occurs, status bits modified in response to the write operation are provided as status bits corresponding to the snoop status read. Therefore, the Exclusive Modified state determined by the data tag write operation is forwarded to state of the snoop tag read operation. Additionally, subsequent to forwarding the status bits, a data hit is asserted indicating that the value accessed by address A0 is stored in data tag cache 42. Again, the status bits are modified to reflect an Exclusive Unmodified State. Because the Exclusive Modified state is reflected during the snoop read operation, cache control logic 34 enables tag unit 36 to provide a correct snoop tag value from the snoop tag cache 40. If the stale status bits had been read, an erroneous snoop tag value would have been retrieved.

Additionally, FIG. 7 also illustrates a "read/write" collision which occurs when a new snoop tag value is written to address A0 in snoop tag cache 40 while a data tag value at address A0 is concurrently read from data tag cache 42. During a first step in writing the new snoop tag value to snoop tag cache 40, corresponding status bits indicate that the stale snoop tag value is in the Invalid state. The Invalid state is then forwarded such that during a read of the data tag value, an erroneous data tag value is not read.

In FIG. 8, a "write/write" collision occurs when both a new data tag value and a new snoop tag value are written to address A0. In this example, the status bits are modified to reflect the modification to the data tag value. Again, the status bits are forwarded such that the accessed snoop tag value is in an Exclusive Modified state rather than an Invalid state.

FIG. 8 also illustrates a timing diagram for a "read/read" collision. However, because status bits are not modified during a read operation, a state is not modified and the status bits do not have to be modified.

Figure 9:
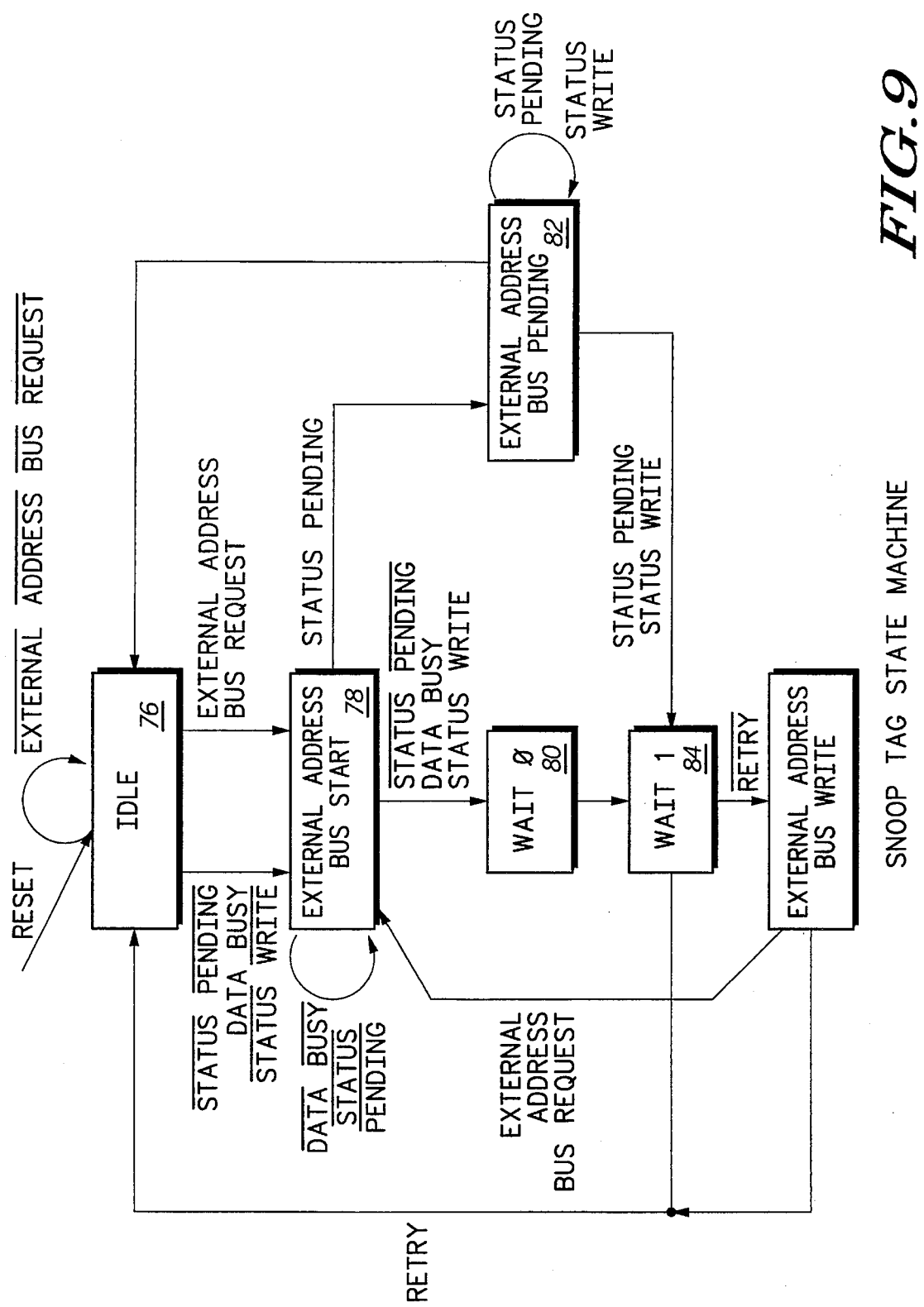
FIG. 9 illustrates in state diagram form a state machine for executing a snoop cache tag write operation in accordance with the present invention.

As previously mentioned, cache control logic unit 34 controls operation of tag unit 36 such that collisions are efficiently processed. FIG. 9 provides a state diagram which illustrates the series of steps which cache control logic circuit 34 executes when performing write operations to the snoop tag 40 in tag unit 36. Each operation of the state diagram is executed by circuitry within cache control logic circuit 34. During operation, cache control logic circuit 34 remains in an IDLE state 76 until a reset signal is asserted by a user of multi-processing system 10 or processor B 21 requests ownership of Address Bus 14. To request ownership of Address Bus 14, processor B 21 must provide a signal labelled "External Address Bus Request" to Control Bus 18. When the External Address Bus Request signal is asserted, cache control logic circuit 34 begins a process to determine whether a snoop tag value should be written. If a data tenure is not currently being executed by processor B 21, cache control logic circuit 34 must wait in a start state 78 until the data tenure is begun. A signal labelled "Data Busy" indicates whether a data tenure is currently being executed. Additionally, cache control logic circuit 34 must remain in state 78 until a status of a data value being written is determined. The status of a data value is indicated by a signal labelled "Status Pending." If the Status Pending signal is asserted, cache control logic circuit 34 must wait in a pending state 82 until the status of the data value is determined and written to an appropriate status storage location such as a status register (not shown). A signal labelled "Status Write" indicates whether the status of the data value is written to the appropriate storage location. If the Status Pending is asserted, but the Status Write signals is not asserted, cache control logic circuit 34 returns to IDLE state 76.

However, if the Status Pending signal is not asserted, but both the Data Busy and Statue Write signals are asserted, cache control logic circuit 34 enters a first Wait 0 state 80 and then a second Wait 1 84 state. During state 84, the Status Pending and Status Write signals are again tested by cache control logic circuit 34. If either the Status Pending or Status Write signals are asserted, cache control logic circuit 34 again goes to IDLE state 76. However, if neither the Status Pending or Status Write signals are asserted, and a Retry signal is not asserted, cache control logic circuit 34 provides appropriate control signals to enable a write a snoop tag value to the snoop tag cache in cache controller 36. Again if the Retry signal is asserted, cache control logic circuit 34 goes to IDLE state 76. After executing the write to the snoop tag cache, cache control logic circuit 34 either goes to the IDLE state 76 to wait for an next External Bus Request signal or goes to start state 76 if an External Bus Request signal is received immediately after executing the write to the the snoop tag cache.

The snoop tag state machine illustrated in FIG. 9 ensures that a snoop tag value may be written to the tag cache 36 of data cache unit 26 without conflict with an external processor. Additionally, by testing to determine whether a data value is currently being written assures that only a valid snoop tag value will be written to the snoop tag cache.

In addition to performing both snoop and write operations concurrently, both processor A 20 and processor B 21 are able to process a plurality of operations which access the same memory storage location in a respective data cache of each. For example, if a data value stored in data memory 37 is both snooped and either written to or read from, each of the accesses is performed without a loss of either efficiency or functionality. Tag unit 36 of processor B 21 provides a plurality of status bits which are dynamically controlled to provide accurate results for both accesses without a loss of processing speed.

The cache controller described herein is able to process simultaneous accesses of a predetermined address location in both the snoop tag cache and data tag cache efficiently and without the loss of functionality. By using both resource pipelining and the status bit forwarding techniques, each of the accesses may be properly executed to provide a correct result. Additionally, by recognizing both a separate address and data tenure, a data processor may access an information value from an external memory circuit and and it's internal data cache concurrently. Separate address and data tenures also allow the data processor to also process an access operation from an external data processor and service it's own access operations simultaneously.

The implementation of the invention described herein is provided by way of example only. However, many other implementations may exist for executing the function described herein. For example, multi-processing system 10 may include more than two processors or have only a single data processor. Additionally, it should be understood that all the pertinent control and interface functions are included in processor B 21 even though they are not explicitly shown. Cache control logic 34 may be implemented as logic circuitry which provides the necessary control to execute the state machine for performing a write to a snoop tag cache in multi-processing system 10. One with ordinary skill in the art should be able to implement the logic circuitry necessary to perform each of the functions described in the state machine. Additionally, the status bit forwarding technique might also be implemented using a single multi-ported cache tag array rather than two cache tag arrays as shown herein.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A method for processing simultaneous accesses of a cache memory, comprising the steps of:

communicating an external address value using an external address bus using an external address bus;

communicating an internal address value using an internal address bus using an internal address bus;

decoding the external address value to access a first memory location in a first cache tag memory using a first decoder, the first decoder being coupled to the external address bus for receiving the external address value;

concurrently decoding the internal address value to access a second memory location in a second cache tag memory using a second decoder, the second decoder being coupled to the external address bus for receiving the internal address value;

concurrently accessing a status value from a status memory which corresponds to both the first memory location in the first cache tag memory and the second memory location in the second cache tag memory, the status memory being coupled to the first cache tag memory and being coupled to the second cache tag memory; and selectively modifying the status value using a logic circuit to provide a modified status value when the first memory location of the first cache tag memory and the second memory location of the second cache tag memory are concurrently accessed.

2. The method of claim 1 further comprising the steps of:

storing a plurality of snoop tag values in the first cache tag memory, a first one of the plurality of snoop tag values being used to indicate when a preselected data value is stored in a memory of a first data processor; and storing a plurality of data tag values in the second cache tag memory, each of the plurality of data tag values being used to indicate when the preselected data value is stored in a cache memory of a second data processor.

3. The method of claim 2 wherein the first memory location of the first cache tag memory is accessed by the external address value when the first data processor performs a snoop data processing operation and wherein the second memory location of the second cache tag memory is accessed by the internal address value when a corresponding data value is stored in the cache memory of the second data processor.

4. The method of claim 3 further comprising the step of:

modifying the status value using the logic circuit when the corresponding data value is written to the cache memory of the second data processor.

5. A cache controller, comprising:

an external address bus;

an internal address bus;

an internal control bus;

a first cache tag memory having a first memory location, the first memory location, the first cache tag memory being coupled to the external address bus;

a second cache tag memory having a second memory location, the second cache tag memory being coupled to the internal address bus; and a status memory having a status value for providing status information to both the first memory location and the second memory location, the status memory comprising:

a first data buffer having a first input coupled to the internal control bus for receiving a first one of the plurality of data status control signals, a second input coupled to the internal control bus for receiving a second one of the plurality of data status control signals, and the first data buffer having an output;

a second data buffer having a first input coupled to the internal control bus for receiving the first one of the plurality of data status control signals, a second input coupled to the internal control bus for receiving a third one of the plurality of data status control signals, the second data buffer having an output;

a first sense amplifier coupled to the first data buffer for receiving the output of the first data buffer, the sense amplifier coupled to the internal control bus to transfer a first data status value;

a first transistor having a first current terminal coupled to the first data buffer for receiving the output of the first data buffer, a second current terminal, and a control terminal coupled to the internal control bus to receive a fourth one of the plurality of data status control signals;

a second transistor having a first current terminal coupled to the second current terminal of the first transistor, a second current terminal, and a control terminal coupled to the internal control bus to receive a fifth one of the plurality of data status control values;

a status bit cell having a first terminal coupled to the second current terminal of the second transistor and having a second terminal;

a third data buffer having a first input coupled to the internal control bus for receiving a first one of the plurality of snoop status control signals, having a second input coupled to the internal control bus for receiving a second one of the plurality of snoop status control signals, the third data buffer having an output;

a fourth data buffer having a first input coupled to the internal control bus for receiving the first one of the plurality of snoop status control signals, the fourth data buffer having a second input coupled to the internal control bus for receiving a second one of the plurality of snoop status control signals, the fourth data buffer having an output;

a second sense amplifier coupled to the third data buffer for receiving the output of the third data buffer, the sense amplifier coupled to the internal control bus to transfer a first snoop status value;

a third transistor having a first current terminal coupled to the third data buffer for receiving the output of the third data buffer, a second current terminal, and a control terminal coupled to the internal control bus to receive a third one of the plurality of snoop status control signals; and a fourth transistor having a first current terminal coupled to the second current terminal of the third transistor, a second current terminal, and a control terminal coupled to the internal control bus to receive an fourth one of the plurality of snoop status control values.

6. The method of claim 5 wherein the status value is selectively modified by the status memory to indicate the second memory location is accessed by the external address value and the status value is selectively modified to indicate the first memory location is concurrently accessed by the internal address value.

7. A cache controller, comprising:

an external address bus for communicating an external address value;

an internal address bus for communicating an internal address value;

a first cache tag memory having a first memory location, the first memory location being accessed by the external address value, the first cache tag memory being coupled to the external address bus for receiving the external address value;

a second cache tag memory having a second memory location, the second memory location being accessed by the internal address value, the second cache tag memory being coupled to the internal address bus for receiving the internal address value;

an execution unit for providing an internal control value;

an internal control bus for transferring the internal control value; and a cache control logic circuit coupled to the internal control bus for communicating the internal control value, coupled to the internal address bus for communicating the internal address value, coupled to the external address bus for communicating the external address bus, the cache control logic circuit, and coupled to the status memory for providing both a plurality of data status control signals and a plurality of snoop status control signals; and a status memory for storing a status value, the status value for providing status information to both the first memory location of the first cache tag memory and the second memory location of the second cache tag memory, the status memory selectively changing the status value to provide a modified status value when the first memory location is accessed by the external address value and the second memory location is concurrently accessed by the internal address value, the status memory comprising:

a first data buffer having a first input coupled to the cache control logic circuit for receiving a first one of the plurality of data status control signals, the first data buffer having a second input coupled to the cache control logic circuit for receiving a second one of the plurality of data status control signals, and the first data buffer having an output;

a second data buffer having a first input coupled to the cache control logic circuit for receiving the first one of the plurality of data status control signals, the second data buffer having a second input coupled to the cache control logic circuit for receiving a third one of the plurality of data status control signals, the second data buffer having an output;

a first sense amplifier coupled to the first data buffer for receiving the output of the first data buffer, the sense amplifier coupled to the cache control logic circuit to transfer a first data status value;

a first transistor having a first current terminal coupled to the first data buffer for receiving the output of the first data buffer, a second current terminal, and a control terminal coupled to the cache control logic circuit to receive a fourth one of the plurality of data status control signals;

a second transistor having a first current terminal coupled to the second current terminal of the first transistor, a second current terminal, and a control terminal coupled to the cache control logic circuit to receive a fifth one of the plurality of data status control values;

a status bit cell having a first terminal coupled to the second current terminal of the second transistor and having a second terminal;

a third data buffer a first input coupled to the cache control logic circuit for receiving a first one of the plurality of snoop status control signals, the third data buffer having a second input coupled to the cache control logic circuit for receiving a second one of the plurality of snoop status control signals, and the third data buffer having an output;

a fourth data buffer having a first input coupled to the cache control logic circuit for receiving the first one of the plurality of snoop status control signals, the fourth data buffer having a second input coupled to the cache control logic circuit for receiving a second one of the plurality of snoop status control signals, the fourth data buffer having an output;

a second sense amplifier coupled to the third data buffer for receiving the output of the third data buffer, the sense amplifier coupled to the cache control logic circuit to transfer a first snoop status value;

a third transistor having a first current terminal coupled to the third data buffer for receiving the output of the third data buffer, a second current terminal, and a control terminal coupled to the cache control logic circuit to receive a third one of the plurality of snoop status control signals; and a fourth transistor having a first current terminal coupled to the second current terminal of the third transistor, a second current terminal, and a control terminal coupled to the cache control logic circuit to receive an fourth one of the plurality of snoop status control values.

* * * * *